No. 642,794. Patented Feb. 6, 1900.
C. F. HOTCHKISS.
FLEXIBLE SHAFT.
(Application filed May 13, 1899.)
(No Model.)
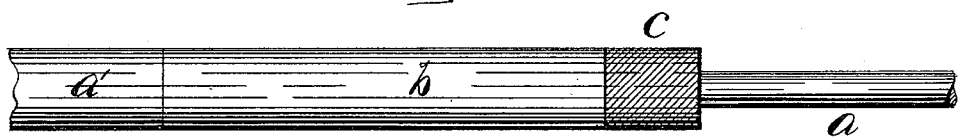
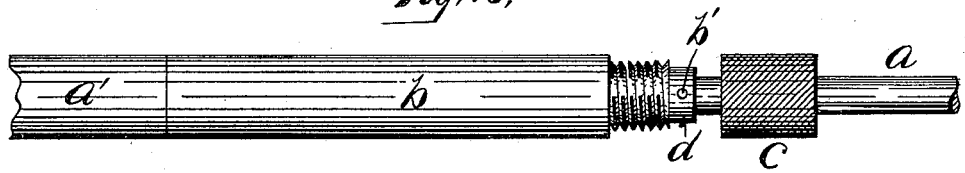
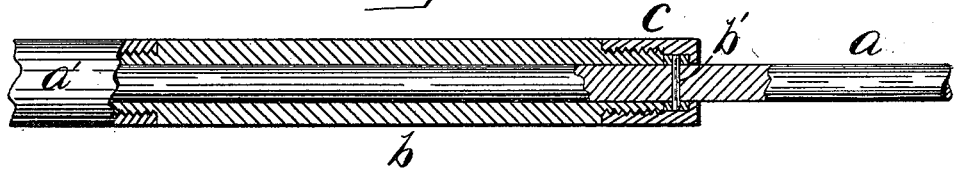
WITNESSES:
INVENTOR
Clarence F. Hotchkiss
BY
Smith & Denison
ATTORNEYS.

UNITED STATES PATENT OFFICE.

CLARENCE F. HOTCHKISS, OF BINGHAMTON, NEW YORK, ASSIGNOR TO THE STOW MANUFACTURING COMPANY, OF SAME PLACE.

FLEXIBLE SHAFT.

SPECIFICATION forming part of Letters Patent No. 642,794, dated February 6, 1900.

Application filed May 13, 1899. Serial No. 716,623. (No model.)

*To all whom it may concern:*

Be it known that I, CLARENCE F. HOTCHKISS, of Binghamton, in the county of Broome, in the State of New York, have invented new and useful Improvements in Flexible Shafts, of which the following, taken in connection with the accompanying drawings, is a full, clear, and exact description.

This invention relates to flexible shafts, having more particular reference to the end construction or piece by which the shaft is handled by the operator.

My object is to improve this end construction by providing the shaft with a removable collar and adjustably clamping it to the handpiece, whereby the wear can be readily taken up and a larger thrust-bearing obtained and provided; and to that end my invention consists of the several new and novel features of construction and operation which are hereinafter described, and specifically set forth in the claim hereunto annexed.

It is constructed as follows, reference being had to the accompanying drawings, in which—

Figure 1 shows a view of a portion of a flexible shaft adjacent its free end provided with my improvement, the inner end being broken away and the outer end being broken away so as not to show the tool, which is operated by the flexible shaft. Fig. 2 is a similar view showing the collar pinned to the driven shaft and the nut removed. Fig. 3 is a longitudinal section through the shaft and pin as it appears in Fig. 1.

$a$ is the rigid or stiff shaft, secured to the outer end of the flexible shaft in any ordinary way, which flexible shaft is inclosed with an ordinary casing terminating in a tubular and interiorly-threaded ferrule $a'$, and $b$ is the handpiece or end construction, in which the shaft $a$ revolves and is suitably connected at one end to said ferrule, and its other end has an abutment for the collar $d$, as shown in Figs. 2 and 3, which collar is separate from the driven shaft and removable therefrom, being secured thereto by a set-screw or pin $b'$, whereby it prevents all longitudinal thrust of the handpiece $b$ when the clamp $c$ is properly adjusted. This clamp is shown as a tubular nut or cap screwed onto the handpiece; but it will be evident that any other kind of suitable clamp can be used, whereby the relation of the collar to the handpiece can be properly maintained and whereby the wear of the collar can be taken up or the collar removed for renewal or any other reason without requiring a new shaft whenever a collar becomes worn.

Having described my invention, what I claim, and desire to secure by Letters Patent, is—

In a flexible shaft the combination of a handpiece, a driven shaft through it, a collar thereon having a bearing against said handpiece, a ferrule removably receiving said handpiece and driven shaft, and a clamp suitably and adjustably holding said collar and shaft in proper freely-revolving relation to said handpiece and taking up the end thrust.

In witness whereof I have hereunto set my hand this 29th day of April, 1899.

CLARENCE F. HOTCHKISS.

Witnesses:
F. W. JENKINS,
ANNA E. HOPE.